United States Patent [19]

Patel

[11] Patent Number: 5,673,022
[45] Date of Patent: Sep. 30, 1997

[54] MOTION SENSOR/PHOTOELECTRIC LIGHT SENSOR PLUG-IN RECEPTACLE

[75] Inventor: Jitendra Ambalal Patel, 8 Sherrywood Rd., Wappingers Falls, N.Y. 12590

[73] Assignee: Jitendra Ambalal Patel, Wappingers Falls, N.Y.

[21] Appl. No.: 622,264

[22] Filed: Mar. 27, 1996

[51] Int. Cl.$^6$ ................................................. G08B 13/00
[52] U.S. Cl. .................. 340/565; 340/567; 340/693; 340/691; 307/117
[58] Field of Search .............................. 340/565, 567, 340/693, 691; 307/117

[56] References Cited

U.S. PATENT DOCUMENTS

| | | | |
|---|---|---|---|
| 4,212,007 | 7/1980 | Reyes et al. | 340/691 |
| 4,319,228 | 3/1982 | Daniels | 340/521 |
| 4,344,071 | 8/1982 | Allen | 340/565 |
| 4,408,308 | 10/1983 | Smith et al. | 367/197 |
| 4,510,488 | 4/1985 | St. Jean et al. | 340/567 |
| 4,549,092 | 10/1985 | Matsuoka et al. | 307/116 |
| 4,823,051 | 4/1989 | Young | 315/155 |
| 5,015,994 | 5/1991 | Hoberman et al. | 340/567 |
| 5,045,833 | 9/1991 | Smith | 340/332 |
| 5,349,330 | 9/1994 | Diong et al. | 340/567 |
| 5,386,210 | 1/1995 | Lee | 340/567 |
| 5,586,048 | 12/1996 | Coveley | 364/492 |

*Primary Examiner*—Jeffery Hofsass
*Assistant Examiner*—Benjamin C. Lee

[57] ABSTRACT

A motion sensor and photoelectric light sensor activated plug-in type electrical receptacle which conveniently plugs into a standard power outlet is disclosed. The device allows non-motion detector and/or non-photoelectric equipped devices to function as motion sensor and/or photoelectric sensor operated devices. The device has motion and photoelectric switches permitting customized applications. The device can be used with any wall or ceiling mounted electrical outlet to automatically turn on and off other plug-in type electrical devices such as night lights, radios, heaters, and thereof, when presence of people and/or pets is detected. This device conveniently plugs into any wall power outlet by means of two or three prongs without requiring new wiring or rewiring of the existing electric circuit.

11 Claims, 5 Drawing Sheets

5,673,022

MOTION SENSOR/PHOTOELECTRIC LIGHT SENSOR PLUG-IN RECEPTACLE

BACKGROUND OF THE INVENTION

Basic motion sensor operated lighting systems are well known in prior art. Generally, these devices automatically turn on a light source when presence of one or more persons is detected within its range. The light source continues to illuminate for a predetermined period of time after the detection ceases. A light sensitive component is usually incorporated to inhibit the activation of the light source when the ambient light level is high. There are two general categories, namely indoor and outdoor automatic lights. Both of these require installation and wiring or rewiring, usually by trained professionals. Indoor automatic and security lights such as disclosed in U.S. Pat. No. 5,015,994 by Kenneth Hoberman and Kim Kirwan solve the installation problem as they can be plugged into a standard wall power outlet by a prolonged plug built into the self-contained lighting devices. However, their application is limited because existing wall outlets may not be situated in a favorable location for detection, illumination and/or ambient light sensing. This constraint may render it impossible to use such devices under certain circumstances. In addition, the self-contained construction of such indoor devices limit the type, size and wattage of the bulbs used.

While all preceding systems of the prior art have brought about a certain degree of convenience and protection providing automatic lighting and security, there remains the need for a versatile, easily installed, user friendly and full feature motion sensor/photoelectric device to provide illumination, or to turn on devices such as radios, night lights, air freshners etc. in places such as bathrooms, living rooms and hallways only when needed.

There remains the need for a small electronic/electrical device which is capable of allowing consumers to operate many non-motion sensor/photoelectric cell operated devices as motional sensor and/or photoelectric sensor devices in response to the presence of one or more persons in the area often maintained in darkness (such bathrooms, bedrooms or hallways), which is small, lightweight, requires no installation and re-wiring, easily portable, and which can be installed and de-installed at will by non-technical consumers.

SUMMARY OF THE INVENTION

In accordance with the teachings of this invention, a novel device is provided which is small, inexpensive, and conveniently plugs into a standard power outlet, thereby allowing easy installation and de-installation by non-technical consumers, and thereby allowing many non-motion sensor and/or photoelectric light sensor activated devices to operate as if these devices are motion sensor and/or photoelectric light controlled. This device includes a motion detector so that the operation of non-motion detector equipped devices occur only in the presence of one or more persons. Means is provided for causing device operate for a desired amount of time after the cessation of movement. A photoelectric device is also provided such that the devices plugged into this present invention will operate in response to motion only when there is an insufficient amount of ambient light available from other sources. Both the motion sensor and the photoelectric light sensor are switched operated to allow use of the present invention in any desired mode. The device of present invention can be designed so that the activation time (duration) can either be at a fixed predetermined level, say 30 minutes, or variable, say 5 to 30 minutes.

Accordingly, one form of the invention comprises a control for electrically energizing a device means, said control having: metal prongs for connection to a source of electrical energy, output means (female receptacles) for connection of electrical energy from the control to said device means, first means to detect the presence of moving infrared radiation sources; second means to compare the level of ambient light with a preset threshold; and means to override the said first means and said second means, said control having modes of operation which comprise:

- a first operation mode wherein said output means is energized upon the detection of a moving infrared radiation source and remains energized for a predetermined period of time after cessation of said detection, provided the ambient light intensity is below a predetermined level,
- a second operation mode wherein said output means is energized regardless of the ambient light intensity and detection of a moving infrared radiation source, and
- a third operation mode wherein said output means is energized regardless of detection of a moving infrared radiation source and ambient light level is below predetermined level, and
- a forth operation mode wherein said output is not energized. In another form the invention comprises;
  (a) means for connecting non-motion sensor and/or photoelectric light sensor equipped electrical devices by way of plugging in;
  (b) means for receiving automatic inputs by detecting the presence of moving infrared radiation sources and ambient light level;
  (c) output means which can provide illumination or other functions when supplied with a source of alternating current electrical power;
  (d) means to provide an electrical connection to a source of alternating current electrical power.
  (e) means to select modes of operation.

Preferably the various modes of operation can be obtained by devices such as passive infrared and photoelectric sensors and a switch for each of the sensor. These sensors are well known in the prior art but none are switch controlled.

Preferably the control means includes means to interrupt the passage of electrical power to the illumination means for a predetermined interval, and means to maintain the passage of electrical power for a predetermined duration.

Preferably the control means includes devices covered in prior art such as a passive infrared (PIR) motion detector, a photocell, proximity sensors, status indicators, and associated electronic circuits all of which are housed within a container which has electrical and mechanical connecting means.

Preferably the control means includes an alarm mode which will sound an alarm or send a signal to a local or remote alarm sounder upon detection of the presence of an intruder.

DETAIL DESCRIPTION OF INVENTION

Figure 1:
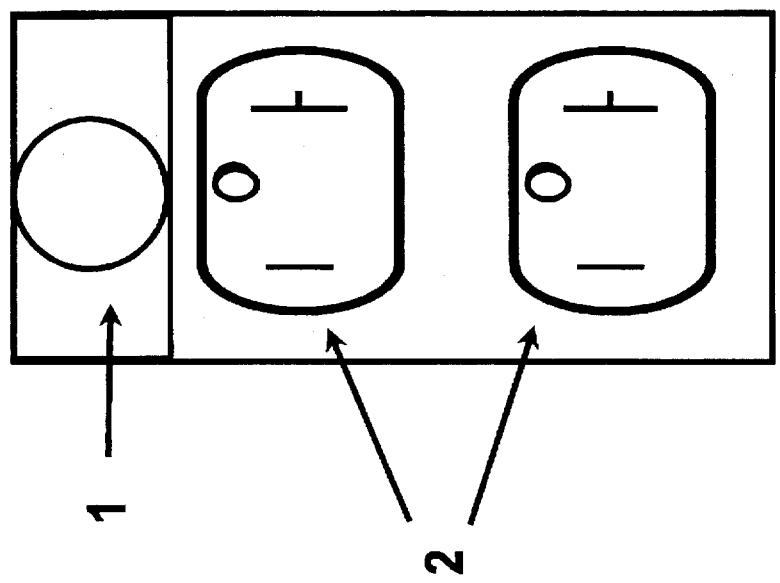
FIG. 1 is a front view of the present invention.

FIG. 1 is a front view of the present invention. The motion detector, preferably the passive infrared type, and photoelectric ambient light detector are positioned on top (1) to avoid obstruction of the motion sensor and the photoelectric sensor by wires and/or plugs that are intended for use in combination with the present invention. Two motion and/or photoelectric sensor activated receptacles (2) are also shown and are provided for plugging in (or removal) of other electrically operated devices such as fans, heaters, radios, and night lights.

Figure 2:
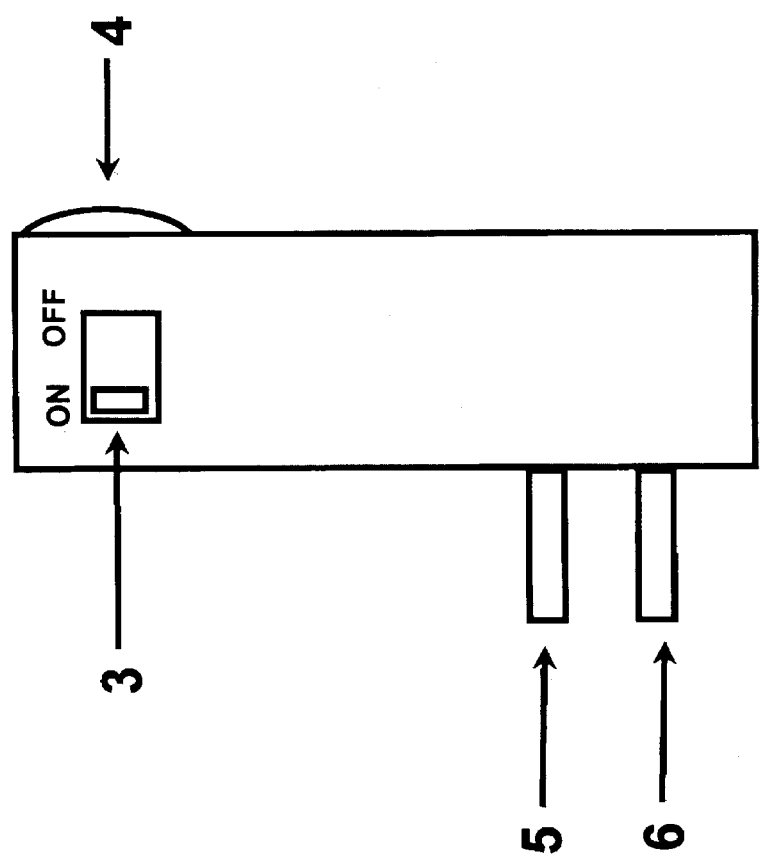
FIG. 2 is a left-side view of the present invention.

FIG. 2 is a left-side view of the present invention. Motion and photoelectric ambient light sensors (4) are located as shown. Also shown, are a motion sensor switch (3), a ground pin (5) and a neutral pin (6) which are integral part of the present invention and are provided for plugging the said device into the wall mounted conventional receptacles. Although the device is shown with a ground plug at the top position, the device of this invention can also be manufactured with a ground plug at the bottom position or without a ground plug to allow use of the present device with older type receptacles. The device can be manufactured with a removable and/or movable ground plug (e.g. screw-in type). A switch (3) for the photoelectric sensor is also shown. Switch (3) in the "ON" position will activate the photoelectric light sensor circuit. By virtue of the design of the said invention, the lower female receptacle on the wall mounted outlet remains assessable for use when needed.

Figure 3:
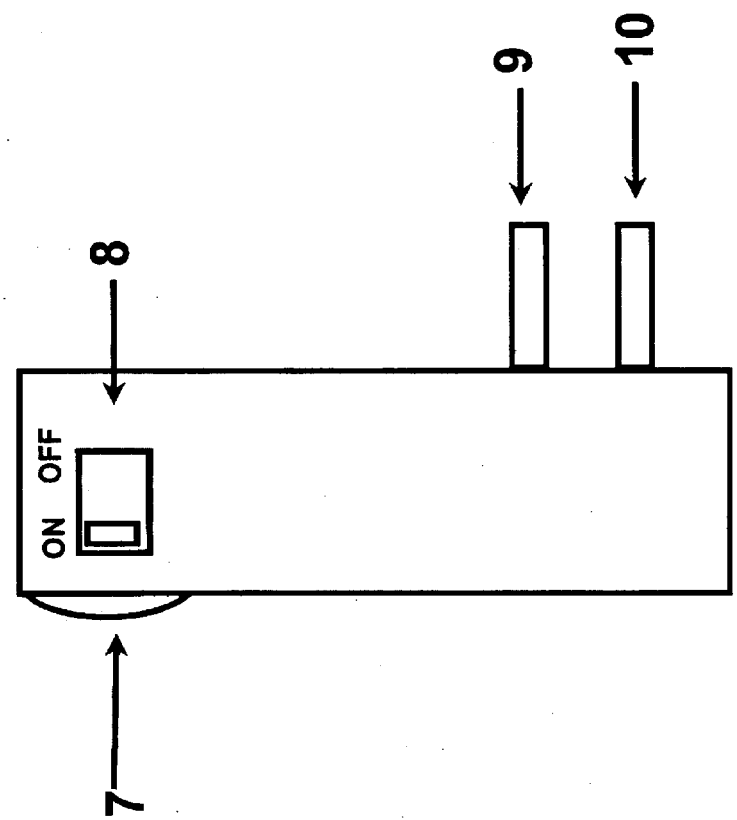
FIG. 3 is a right-side view of the present invention.

FIG. 3 is a right-side view of the present invention. In addition to the motion and photoelectric light detectors (7), ground pin (9) and hot pin (10), a switch (8) for the motion sensor are shown. Switch (8) in the "ON" position will activate the motion sensor circuit.

Figure 4:
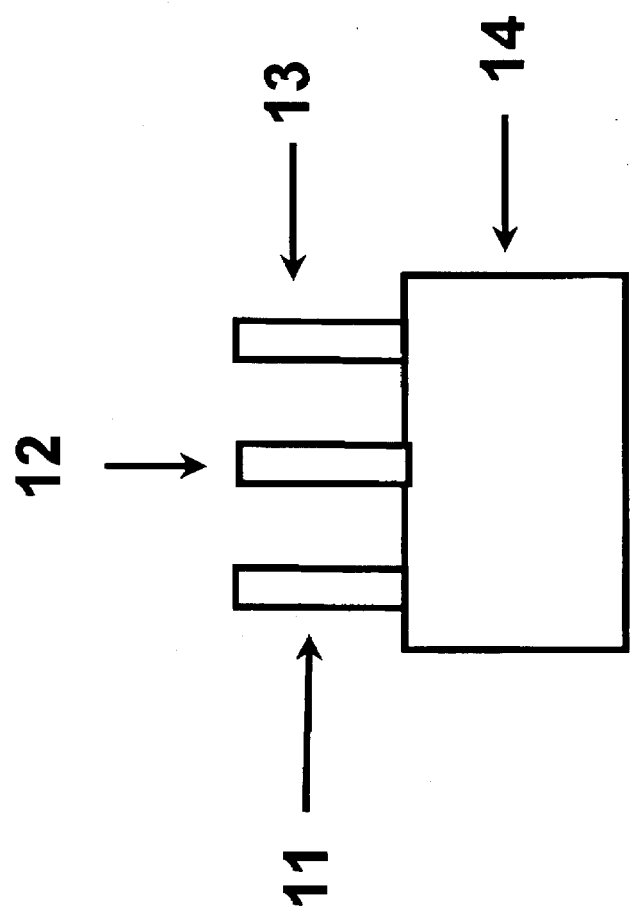
FIG. 4 is a top view of the present invention.

FIG. 4 is a top view of the present invention. Main body (14) of the present invention, neutral pin (11), ground pin (12) and hot pin (13) are shown. These pins supply power to the present invention.

Figure 5:
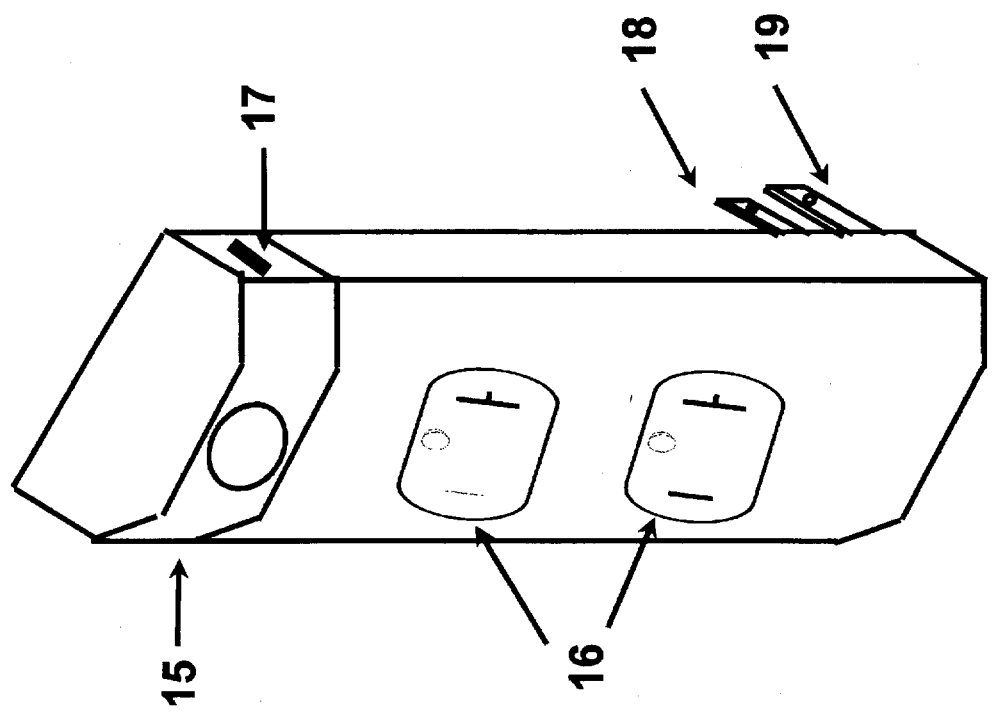
FIG. 5 is a three dimensional view of the present invention.

FIG. 5 is a three dimensional view of the present invention. Motion sensor and/or photoelectric sensors (15) are positioned on top. The top location of these sensors minimize or eliminate obstructions by wires and plugs of other devices. Switch (17) for the motion sensor is also shown. Two motion and/or photoelectric sensor activated receptacles (16) are shown but the device can be designed with any number of receptacles as desired. Neutral pin (18) and hot pin (19) are provided for plugging this device into one of the two conventional wall or ceiling mounted receptacles. For clarity purpose, the ground pin is not shown.

The following table illustrates various combinations for the operation of the present invention.

| Sensor Type | | |
|---|---|---|
| Photoelectric Switch Position | Motion | Output controlled by: |
| ON | ON | Motion sensor and Ambient light level |
| ON | OFF | Ambient light level |
| OFF | ON | Motion sensor regardless of ambient light level |
| OFF | OFF | No output |

What is claimed is:

1. A motion sensor/photoelectric light sensor device for electrically energizing non-motion sensor equipped electrical devices, said sensor device having: input means for connection to a source of electrical energy, output means for connecting electrical energy from said source through a control to said electrical devices, a first means to detect the presence of moving infrared radiation sources, a means to detect ambient light, a second means to compare the level of ambient light with a preset threshold, and a third means to electronically override the said first means and said second means; said control having modes of operation which comprise:

a first operation mode wherein said output means is energized upon the detection of a moving infrared radiation source and remains energized for a predetermined period of time after cessation of said moving infrared radiation detection, provided the ambient light intensity is below a predetermined level; a second operation mode wherein said output means is energized when the ambient light intensity is below a predetermined level regardless of detection of a moving infrared radiation source; and a third operation mode wherein said output means is energized by moving infrared radiation detection regardless of ambient light level, wherein each of said operation modes is controlled by at least one signal generated by at least one sensor selected from said first means and the ambient light detecting means.

2. The device as claimed in claim 1, further comprising means for adjusting the duration for which said output means remains energized after cessation of detection of a moving infrared radiation source while functioning under said first operation mode.

3. The device as claimed in claim 1, further comprising means to automatically reset to a preferred operation mode after a total loss of electrical energy.

4. The device as claimed in claim 1, wherein the control comprises plurality of components which are housed in a self-contained unit.

5. The device in claim 1 which further comprises: means for disabling said output means in response to a sensed predetermined amount of ambient light when in said first or said second operation mode.

6. The device as in claim 1 wherein said first means comprises a passive infrared motion detector.

7. The device as in claim 1 wherein the ambient light detector means comprises a photoelectric light detector.

8. The device in claim 1 which further comprises means for selecting a desired amount of time during which power is applied to said devices, after motion is no longer detected.

9. The device in claim 1, wherein the motion sensing unit is mounted on the bottom of the device, or at the top to avoid obstruction by wires and/or plugs of non-motion sensor equipped electrical devices.

10. The device in claim 1, which permits customizing of outputs based on motion and/or light level by selecting the position of motion sensor and photoelectronic switches which allow selection of said operation modes.

11. The device in claim 1, which contains a provision to either activate said devices for a predetermined fixed time or for a range of time.

* * * * *